(12) United States Patent
Vandevoorde et al.

(10) Patent No.: US 6,887,937 B1
(45) Date of Patent: May 3, 2005

(54) COATING COMPOSITION BASED ON A HYDROXY GROUP-CONTAINING FILM FORMING POLYMER, A POLYISOCYANATE COMPOUND, AND A DIOL

(75) Inventors: Paul Marie Vandevoorde, Essen (BE); Antonius H. G. Van Engelen, Troy, MI (US); Ann Alfred J. Lemaire, Leiderdorp (NL)

(73) Assignee: Akzo Nobel NV, Arnhem (NL)

( * ) Notice: Subject to any disclaimer, the term of this patent is extended or adjusted under 35 U.S.C. 154(b) by 319 days.

(21) Appl. No.: 09/444,968

(22) Filed: Nov. 22, 1999

Related U.S. Application Data

(63) Continuation of application No. PCT/EP98/03024, filed on May 19, 1998.

(30) Foreign Application Priority Data

May 21, 1997 (EP) .............................. 97201511

(51) Int. Cl.$^7$ .............................................. C08L 75/00
(52) U.S. Cl. ....................... 525/131; 525/127; 525/176; 428/423.1
(58) Field of Search ............... 525/131, 127, 525/176; 428/423.1

(56) References Cited

U.S. PATENT DOCUMENTS 5,798,409 A * 8/1998 Ho .............................. 524/506
6,309,707 B1 * 10/2001 Mayer et al. ............ 427/385.5

FOREIGN PATENT DOCUMENTS

| EP | 0 645 411 A1 | 3/1995 | ........... C08G/18/79 |
| EP | 0 676 431 A1 | 10/1995 | ........... C08G/18/65 |
| JP | 1991-52969 | 3/1991 | |
| JP | 1996-59784 | 3/1996 | |
| WO | WO 97/16466 | 5/1997 | ........... C08G/18/32 |

OTHER PUBLICATIONS

Japanese Patent abstract JP4309569, Feb. 11, 1992.
Japanese Patent abstract JP4050221, Feb. 19, 1992.
International Search Report Dated Sep. 4, 1998.

* cited by examiner

*Primary Examiner*—James J. Seidleck
*Assistant Examiner*—Melanie Bissett
(74) *Attorney, Agent, or Firm*—Joan M. McGillycuddy

(57) ABSTRACT

A coating composition comprising a hydroxy group-containing film forming polymer with a hydroxy value between 75 and 300 mg KOH/g solid resin, a polyisocyanate compound, and a diol of the general formula HO—$CH_2$—CR($C_2H_5$)—$CH_2$—OH, wherein R is an alkyl group having 3–6 carbon atoms. The invention further relates to a method of coating which comprises said coating composition being applied to a substrate, and to a coated substrate, in particular cars and large transport vehicles.

17 Claims, No Drawings

COATING COMPOSITION BASED ON A HYDROXY GROUP-CONTAINING FILM FORMING POLYMER, A POLYISOCYANATE COMPOUND, AND A DIOL

This is a continuation of International Application No. PCT/EP98/03024, with an international filing date of May 19, 1998, designating the United States of America, presently pending, but expressly abandoned after the filing and acceptance of the present application. This application claims priority of European Patent Application No. 97201511.9 filed May 21, 1997.

BACKGROUND OF THE INVENTION

The invention relates to a coating composition, a method of applying the same, and a coated substrate comprising the same.

Coatings used for painting motor vehicles and repairing the original paint are required to have good physical properties such as hardness, mechanical strength, and resistance to water, acids, and solvents. The coatings are also required to have good appearance properties, which means that films must be smooth and have a high gloss and high distinctness of image. It is also desirable that all properties are retained under prolonged outdoor weathering.

A large number of cars and transport vehicles are coated with a multilayer topcoat system wherein an unpigmented clearcoat is applied over a pigmented basecoat. Both solvent borne and water borne clearcoats and basecoats are in use. So-called metallic basecoats comprise metallic flakes.

For environmental reasons, it is required to use a coating composition which can be applied easily using spray application at a low volatile organic content (VOC). Coatings with a lower organic solvent content emit lower levels of solvent when they are used and so the atmosphere becomes less polluted.

One way to achieve a lower solvent content is to use so-called high-solids compositions. Such compositions comprise a relatively high level of non-volatile materials such as film forming polymer, pigments, and fillers, and a relatively low level of organic solvent. A problem when formulating high-solids coating compositions is that such compositions have an unacceptably high viscosity due to the high molecular weight of the conventional film forming polymer. The high viscosity gives rise to problems in spray application with poor paint atomization and poor flow-out and, consequently, low gloss levels and poor appearance.

The use of low-molecular weight film forming polymers, which results in adequate application viscosities, has as a disadvantage that the resulting coating is soft and marks easily. The hardness build-up of the coating is therefore unacceptable. Furthermore, when used in a clearcoat composition, due to the solvency of the low-molecular weight film forming polymers, basecoat properties will suffer from strike-in effect, i.e. discolouration of the basecoat due to its salvation by the clearcoat composition.

Low VOC coating compositions are disclosed in EP-A-0 676 431. In this patent application 1,4-cyclohexane dimethanol is mentioned as a component in a coating composition with a VOC of less than 500 g/l. Unfortunately, coating compositions comprising 1,4-cyclohexane dimethanol appear to have an unfavourable pot life/drying balance. Additionally, when the coating composition disclosed in EP-A-0 676 431 is applied as a clearcoat on a basecoat, the basecoat properties will suffer from the above-mentioned strike-in effect.

Japanese patent application JP 59784-96 discloses a resin composition comprising an acrylic polymer, a polyisocyanate, and a diol. These acrylic polymers have a hydroxy value of 34 and 39. Accordingly, the resulting coating composition will be very flexible and non-resistant to water, acids, and solvents. Thus, the disclosed resin composition is unsuitable as a coating composition for car (re)finish applications.

Accordingly, there is a need for a coating composition which combines all the required properties, such as good thinnability, low VOC, good mixing properties, and low application viscosities, and results in a coating with fast drying times at low temperatures, high film hardness, easy polishability, good resistance to water, acids, and solvents, and excellent durability. When used as a clearcoat, properties such as a low strike-in effect to the basecoat and good transparency are also required.

SUMMARY OF THE INVENTION

The present invention provides a coating composition with the above-mentioned properties comprising a hydroxy group-containing film forming polymer with a hydroxy value between 75 and 300 mg KOH/g solid resin, a polyisocyanate compound, and a diol of the general formula HO—$CH_2$—$CR(C_2H_5)$—$CH_2$—OH, wherein R is an alkyl group having 3–6 carbon atoms.

DETAILED DESCRIPTION OF THE INVENTION

R in the above-mentioned diol can be linear or branched propyl, butyl, pentyl, and hexyl. Examples of R are n-propyl, isopropyl, n-butyl, isobutyl, sec-butyl, n-pentyl, n-hexyl, and the like. Preferably, R is n-butyl, the preferred diol thus being 2-n-butyl-2-ethyl-1,3-propane diol.

The diol of the present invention can be added at any stage in the preparation of the coating composition. If solid, the diol can be added as a solid or a melt to a dispersion comprising the hydroxy group-containing film forming polymer, preferably at temperatures above the melting temperature of the solid diol.

The coating composition can also comprise a polyester or polyurethane having units derived from the above-mentioned diol. The polyesters or polyurethanes may contain more than 20% by weight, preferably more than 40% by weight, of units derived from the diol of the invention.

Preferred polyesters have a hydroxyl number of 75 to 350 mg KOH/g solid resin, more preferably in the range of 100 to 300 and an acid value of less than 50 mg KOH/g solid resin, preferably less than 30. The preferred number average molecular weight ranges from 300 to 3000, more preferably from 350 to 1500, as measured by gel permeation chromatography. Preferred polyurethanes have a hydroxyl number of 50 to 300 mg KOH/g solid resin, more preferably in the range of 100 to 300. The preferred number average molecular weight ranges from 300 to 3000, more preferably from 300 to 1500, as measured by gel permeation chromatography. It is preferred that the polyesters and polyurethanes have a hydroxy functionality of 2 to 4.

The polyesters are the condensation product of the diol of the invention with polycarboxylic acid(s) or with the reaction product of polyalcohol(s) and polycarboxylic acid(s). Such polyesters are produced according to well known condensation techniques.

Examples of suitable polycarboxylic acids or derivatives thereof are succinic anhydride, adipic acid, dimethyl adipate, tetrahydrophthalic anhydride, hexahydrophthalic anhydride, methyl hexahydrophthalic anhydride, 1,4-cyclohexane dicarboxylic acid, phthalic anhydride, isophthalic anhydride, trimellitic anhydride, and mixtures thereof.

Examples of suitable polyalcohols are glycerol, pentaerythritol, trimethylol propane, ditrimethylol propane, neopentyl glycol, 1,4-cyclohexane dimethanol, 1,2-propane diol, 2-methyl-1,3-propane diol, the monoester of neopentyl glycol and hydroxy pivalic acid, 2,2,4-trimethyl-1,3-pentane diol, 1,6-hexane diol, and dimethylol propionic acid, and mixtures thereof.

The polyurethanes are the condensation product of the diol of the invention with polyisocyanate(s) or with the reaction product of polyalcohol(s) and polyisocyanate(s). Such polyurethanes are produced according to well known condensation techniques. A preferred method consists of adding polyisocyanate(s) to the diol of the present invention and, optionally, polyalcohol(s) at a temperature in the range from 15 to 100° C., optionally in the presence of a catalyst.

Polyisocyanates useful herein comprise polyisocyanate having two or more, preferably two to four isocyanate groups. Examples of the preferred polyisocyanates include toluene diisocyanate, methylene bis(4-cyclohexyl isocyanate), isophorone diisocyanate and its isocyanurate, hexamethylene diisocyanate and its isocyanurate, biuret, uretdione, and allophanate, para- and meta-$\alpha,\alpha,\alpha',\alpha'$-tetramethyl xylylene diisocyanate and the adduct thereof with trimethylolpropane.

Examples of preferred polyalcohols suitable for the production of the above-mentioned polyurethane include ethane diol, 1,2-propane diol, 2-methyl-1,3-propane diol, trimethylol propane, glycerol, 1,3-butane diol, neopentyl glycol, 2,2,4-trimethyl-1,3-pentane diol, 1,4-cyclohexane dimethanol, the monoester of neopentyl glycol and hydroxy pivalic acid, dimethylol propionic acid, and mixtures thereof. Other preferred polyalcohols for the production of suitable polyurethanes include polyester and polyether diols having a number average molecular weight of less than 1000, as measured by gel permeation chromatography, for example the polyester diol prepared from 1 mole of phthalic anhydride and 2 moles of neopentyl glycol.

Homogeneous mixtures of the diol of the present invention and polyesters or polyurethanes containing units derived from the diol can be produced most conveniently by using an excess of the diol for the production of the polyester or polyurethane. If desired, it is possible to add further amounts of the diol to the resulting mixture. The mixture can be added at any stage in the preparation of the coating composition.

An example of a suitable homogeneous mixture of a polyester and a diol of the present invention is the condensation product of 1 mole of hexahydrophthalic anhydride and 2 moles of 2-n-butyl-2-ethyl-1,3-propane diol. The polyester has a hydroxy value of 237 mg KOH/g solid resin, an acid number of 2.9 mg KOH/g solid resin, a number average molecular weight of 379, a weight average molecular weight of 547 whereby polypropylene glycol was used as a standard for gel permeation chromatography (GPC). The hydroxy functionality of the polyester is 2. This polyester is a colourless viscous liquid containing 15.1% by weight of free 2-n-butyl-2-ethyl-1,3-propane diol as determined by gas liquid chromatography. An 80 wt. % solid solution of the polyester in butylacetate has a viscosity of 420 mPas at 23° C. as measured according to ISO 3219.

The hydroxy group-containing film forming polymer can be any polymer known in the coating art. The hydroxy group-containing film forming polymer may be a polyester, polyether, polyurethane, polycarbonate, polyacrylate, or mixtures thereof. The hydroxy group-containing film forming polymer must have a hydroxy value of between 75 and 300 mg KOH/g solid resin, preferably between 75 and 250 mg KOH/g solid resin. The number average molecular weight of the polymer is lower than 5000, as measured by gel permeation chromatography, preferably less than 3000. The degree of molecular dispersion, i.e., the ratio of Mw to Mn, preferably is in the range of 1.1 to 5, the range from 1.1 to 3 being particularly preferred. The acid value of the polymer is between 0 and 50 mg KOH/g solid resin.

The hydroxy group-containing film forming polymer preferably is a polyacrylate. Such polyacrylate is derived from hydroxy-functional acrylic monomers, such as hydroxy ethyl(meth)acrylate, hydroxy propyl (meth) acrylate, hydroxy butyl (meth)acrylate, other acrylic monomers such as (meth)acrylic acid, methyl (meth)acrylate, butyl (meth)acrylate, optionally in combination with a vinyl derivative such as styrene, and the like, or mixtures thereof, wherein the terms (meth)acrylate and (meth)acrylic acid refer to both methacrylate and acrylate, as well as methacrylic acid and acrylic acid, respectively. The polyacrylate is prepared by conventional methods, for instance, by the slow addition of appropriate monomers to a solution of an appropriate polymerization initiator, such as an azo or peroxy initiator.

The polyisocyanate compound is a cross-linker which reacts with hydroxy groups. Polyisocyanates are compounds with two or more isocyanate groups-per molecule, and are well-known in the coating art. Suitable polyisocyanates are aliphatic polyisocyanates such as trimethylene diisocyanate, 1,2-propylene diisocyanate, tetramethylene diisocyanate, 2,3-butylene diisocyanate, hexamethylene diisocyanate, octamethylene diisocyanate, 4-isocyanatomethyl-1,8-octane diisocyanate, 2,2,4-trimethyl hexamethylene diisocyanate, 2,4,4-trimethyl hexamethylene diisocyanate, dodecamethylene diisocyanate, $\alpha,\alpha'$-dipropyl ether diisocyanate, and transvinylidene diisocyanate; alicyclic polyisocyanates, such as 1,3-cyclopentylene diisocyanate, 1,2-cyclohexylene diisocyanate, 1,4-cyclohexylene diisocyanate, 4-methyl-1,3-cyclohexylene diisocyanate, 4,4'-dicyclohexylene diisocyanate methane, 3,3'-dimethyl-4,4'-dicyclohexylene diisocyanate methane, norbornane diisocyanate, and isophorone diisocyanate; aromatic polyisocyanates such as m- and p-phenylene diisocyanate, 1,3- and 1,4-bis(isocyanate methyl) benzene, 1,5-dimethyl-2,4-bis(isocyanate methyl) benzene, 1,3,5-triisocyanate benzene, 2,4- and 2,6-toluene diisocyanate, 2,4,6-toluene triisocyanate, $\alpha,\alpha,\alpha',\alpha'$-tetramethyl o-, m-, and p-xylylene diisocyanate, 4,4'-diphenylene diisocyanate methane, 4,4-diphenylene diisocyanate, 3,3'-dichloro-4,4'-diphenylene diisocyanate, and naphthalene-1,5-diisocyanate, and mixtures of the aforementioned polyisocyanates.

Also, such compounds may be adducts of polyisocyanates, e.g., biurets, isocyanurates, allophonates, uretdiones, prepolymers of polyisocyanates, and mixtures thereof. Examples of such adducts are the adduct of two molecules of hexamethylene diisocyanate or isophorone diisocyanate to a diol such as ethylene glycol, the adduct of 3 molecules of hexamethylene diisocyanate to 1 molecule of water, the adduct of 1 molecule of trimethylol propane to 3 molecules of isophorone diisocyanate, the reaction product of 3 moles of m-$\alpha,\alpha,\alpha',\alpha'$-tetramethylxylene diisocyanate with 1 mole of trimethylol propane, the adduct of 1 molecule of pentaerythritol to 4 molecules of toluene diisocyanate, the isocyanurate of hexamethylene diisocyanate, available from Bayer under the trade designation Desmodur® N3390 and Desmodur® LS2025, the uretdione of hexamethylene diisocyanate, available from Bayer under the trade designation Desmodur® N3400, the allophonate of hexamethylene diisocyanate, available from Bayer under the trade designation Desmodur® LS 2101, the adduct of 3 moles of toluene diisocyanate to 1 mole of trimethylol propane, available from Bayer under the trade designation Desmodur® L, and the isocyanurate of isophorone diisocyanate, available from Hüls under the trade designation Vestanat® T1890. Furthermore, (co)polymers of isocyanate-functional monomers such as α,α'-dimethyl-m-isopropenyl benzyl isocyanate are suitable for use. Finally, the above-mentioned isocyanates and adducts thereof may be present in the form of blocked isocyanates, as is known to the skilled man.

The polyisocyanate compound is used in an amount such that the ratio of isocyanate groups to the total number of hydroxy groups in the coating composition is in the range 0.8 to 2.

The coating composition comprises the diol of the invention in an amount of 1 to 25% by weight, based on the weight of the hydroxy group-containing film forming polymer. The above-mentioned polyester and polyurethane having units derived from the diol of the present invention are not taken into account as a hydroxy group-containing film forming polymer for the calculation of the amount of the diol in the coating composition. More preferably, the amount of diol is 2 to 20% by weight.

The coating composition can also comprise catalysts for the isocyanate-hydroxy reaction, such as dibutyl tin dilaurate, triethyl amine, and the like. The coating compositions may also contain pigments. Inorganic as well as organic pigments can be used. The composition can further comprise conventional additives, such as stabilizers, surfactants, fillers, UV-absorbers, catalyst blockers, antioxidants, pigment dispersants, flow additives, rheology control agents, levelling agents, and solvents. The solvent can be any solvent known in the art, i.e. aliphatic and/or aromatic hydrocarbons. Examples include Solvesso® 100, toluene, xylene, butanol, isopropanol, butyl acetate, ethyl acetate, acetone, methyl isobutyl ketone, methyl isoamyl ketone, methyl ethyl ketone, ether, ether alcohol, and ether ester, or a mixture of any of these.

Preferably, the coating composition comprises less than 500 g/l of volatile organic solvent based on the total composition, more preferably less than 480 g/l, most preferably less than 420 g/l. The solid content preferably is higher than 50 wt. %, more preferably higher than 52 wt. %, most preferably higher than 58 wt. %.

The coating compositions are formulated in a 1-, 2-, or 3-component system, depending on the choice of free isocyanate or blocked isocyanate groups and the presence of catalysts in the system.

The coating composition of the present invention may be applied to any substrate. The substrate may be, for example, metal, plastic, wood, glass, ceramic, or another coating layer. The other coating layer may be comprised of the coating composition of the current invention or it may be a different coating composition. The coating compositions of the current invention show particular utility as clearcoats, basecoats, pigmented topcoats, primers, and fillers. The coating compositions can be applied by conventional means such as by spray gun, brush, or roller, spraying being preferred. Curing temperatures are preferably between 0 and 80° C., and more preferably between 20 and 60° C. The compositions are particularly suitable in the preparation of coated metal substrates, such as in the refinish industry, in particular the body shop, to repair automobiles and transportation vehicles and in finishing large transportation vehicles such as trains, trucks, buses, and aeroplanes.

Preferred is the use of the coating composition of the present invention as clearcoat. Clearcoats are required to be highly transparent and must adhere well to the basecoat layer. It is further required that the clearcoat does not change the aesthetic aspect of the basecoat by strike-in, i.e. discolouration of the basecoat due to its salvation by the clearcoat composition, or by yellowing of the clearcoat upon outdoor exposure. A clearcoat based on the coating composition of the present invention does not have these drawbacks.

In the case of the coating composition being a clearcoat, the basecoat may be a conventional basecoat known in the coating art. Examples are solvent borne basecoats, e.g., Autobase® ex Sikkens, based on cellulose acetobutyrate, acrylic resins, and melamine resins, and water borne basecoats, e.g., Autowave® ex Sikkens, based on an acrylic resin dispersion and polyester resin. Furthermore, the basecoat may comprise pigments (colour pigments, metallics and/or pearls), wax, solvents, flow additives, neutralizing agent, and defoamers. Also high-solid basecoats can be used.

These are, for instance, based on polyols, imines, and isocyanates. The clearcoat composition is then applied to the surface of a basecoat and then cured. An intermediate curing step for the basecoat may be introduced.

The invention is further illustrated by the following examples.

EXAMPLES

Methods:

The viscosity is measured in a DIN flow cup number 4 in accordance with DIN 53221-1987. The viscosity is given in seconds.

The pot life is the time between the initial mixing of all components and the point where the viscosity has increased to 1.5 times the initial viscosity.

A coating is free to handle (FTH) when the mark from firm pushing with the thumb disappears after 1 or 2 minutes.

The hardness is measured using ISO 1522, except that a steel plate, treated as indicated in the examples, is used instead of a glass plate.

The gloss is measured in accordance with ISO 2813:1994 (angle 20°). The gloss is expressed in GU.

The Enamel Hold Out (EHO) is determined as the total visual appearance. Each sample is rated for visual appearance on a scale of 1 to 10 (1=very bad appearance, 10=excellent appearance) by a panel of at least 3 people (n). The determination takes into account gloss, wrinkling, flow and image clarity/distinctness of image. The average number will give the EHO.

Compounds

High-solids acrylic A is a hydroxy group-containing polyacrylate with the following monomer composition: styrene, methyl methacrylate, butyl acrylate, butyl methacrylate, hydroxypropyl methacrylate, and methacrylic acid. Mw=4000; Mn=1800 (GPC with polystyrene as standard); hydroxy value=171 mg KOH/g solid resin, acid value=6 mg KOH/g solid resin, solids content=70 wt. %.

High-solids acrylic B is a hydroxy group-containing polyacrylate with the following monomer composition: styrene, methyl, methacrylate, butyl acrylate, butyl methacrylate, hydroxyethyl methacrylate, and methacrylic acid. Mw=3000; Mn=1500 (GPC with polystyrene as standard); hydroxy value=170 mg KOH/g solid resin, acid value=6 mg KOH/g solid resin; solids content=66 wt. %.

The polyester used in Example 3 is the condensation product of 1 mole hexahydrophthalic anhydride and 1.56 moles of 2-n-butyl-2-ethyl-1,3-propane diol. Mw=804; Mn=514 (GPC with polypropylene glycol as standard); hydroxy value=165 mg KOH/g solid resin, acid value=2.4 mg KOH/g solid resin, hydroxy functionality of the polyester is 2. The polyester is a viscous colourless liquid containing 7.5% by weight of free 2-n-butyl-2-ethyl-1,3-propane diol as determined by gas liquid chromatography. A 80 wt. % solid solution of the polyester in butylacetate has a viscosity of 1000 mPas at 23° C. as measured according to ISO 3219.

DBTL is dibutyl tin dilaurate, 10 wt. % in butyl acetate/xylene, 1/1 weight ratio.

The flow additive in Table 1 is a 35 wt. % mixture of Byk 355 and Byk LPG 6491 (weight ratio 15/20) in butyl acetate, ex Byk Chemie.

Byk 306 is a flow additive ex Byk-Chemie.

Dow Corning PA 11 is a 25 wt. % silicone oil solution in butyl acetate ex Dow Corning.

Tinuvin 1130 is a UV stabilizer, ex Ciba-Geigy.

Tinuvin 292 is a HALS stabilizer, ex Ciba-Geigy.

Desmodur® LS2025 is an aliphatic polyisocyanate, based on the isocyanurate of hexamethylene diisocyanate, ex Bayer.

Solvesso 100 is a solvent blend ex Exxon.

Example 1

This example shows a basecoat/clearcoat system wherein the clearcoat composition comprises a hydroxy group-containing polyacrylate, a polyisocyanate compound, and 2-n-butyl-2-ethyl-1,3-propane diol.

Autocryl® filler 3110 ex Sikkens was applied by spraying onto a sanded steel panel. After sanding of the filler, Autowave® MM metallic basecoat (a water-borne basecoat ex Sikkens) was sprayed onto it. After the basecoat was dried at room temperature for 30 minutes, the clearcoat composition was applied by being sprayed on top of it. The coating was cured at room temperature and at elevated temperature (at 60° C.). The dried layer thickness of the basecoat was 10–20 microns, the layer thickness of the clearcoat was 40–60 microns.

The clearcoat composition comprises three components which are mixed prior to use. The three components are shown in Table 1:

TABLE 1

|  | weight % |
|---|---|
| Component 1 | |
| high-solids acrylic A | 35.7 |
| 2-n-butyl-2-ethyl-1,3-propane diol | 4.29 |
| methoxypropyl acetate | 2.86 |
| methyl isoamyl ketone | 0.86 |
| isobutyl acetate | 1.93 |
| butyl acetate | 1.50 |
| DBTL | 0.64 |
| flow additive | 0.43 |
| Tinuvin 1130 | 0.34 |
| Tinuvin 292 | 0.42 |
| Component 2 (hardener) | |
| Desmodur ® LS2025 | 30.0 |
| butyl acetate | 6.42 |
| ethoxy ethyl propionate | 6.42 |
| Component 3 (thinner) | |

TABLE 1-continued

|  | weight % |
|---|---|
| methoxypropyl acetate | 2.86 |
| methyl isoamyl ketone | 0.86 |
| isobutyl acetate | 1.93 |
| butyl acetate | 1.50 |
| 2,4 pentanedione | 1.07 |

The pot life of the clearcoat composition is 50 min. The viscosity of the clearcoat composition when ready to spray is 18 seconds. The VOC of the coating composition (ready-to-spray) is 420 g/l (calculated from the composition of the Table). The VOC is 380 g/l when measured in accordance with ASTM D2369.

When cured at 60° C. the clearcoat is free to handle after 30 min. When cured at room temperature (RT=±20° C.) the clearcoat is free to handle after approximately 3 hours. The appearance of the coating is excellent. EHO is rated 9 (n=3). Leveling and gloss are very good. Measured gloss is 88 GU. No strike-in effect can be detected. The Persoz hardness of the coating (after 5 days) is 69 Persoz seconds for the system which is dried at room temperature and 112 Persoz seconds for the system dried at 60° C.

Example 2 and Comparative Examples A–F

These examples show basecoat/clearcoat systems wherein the clearcoat compositions comprise a hydroxy group-containing polyacrylate, a polyisocyanate compound, and several diol compounds.

A steel panel coated with a basecoat was prepared as described in Example 1. Several clearcoat compositions were applied by spraying on top of the basecoat. The coating was cured at room temperature and at elevated temperature (at 60° C.).

The clearcoat compositions comprise each three components which are mixed prior to use. The three components are shown in Table 2:

TABLE 2

|  | amount in g |
|---|---|
| Component 1 | |
| high-solids acrylic A | 100 |
| diol of example 2 or comparative examples A–F | 12 |
| ethoxy ethyl propionate | 1.9 |
| Solvesso 100 | 1.8 |
| DBTL | 1.8 |
| Byk 306 | 0.84 |
| Tinuvin 1130 | 1.14 |
| Tinuvin 292 | 0.96 |
| Component 2 (hardener) | |
| Desmodur ® LS2025 | 54.6 |
| butyl acetate | 11.7 |
| ethoxy ethyl propionate | 11.7 |
| Component 3 (thinner) | |
| Solvesso 100 | 11.4 |
| ethoxy ethyl proprionate | 11.4 |
| 2,4 pentanedione | 5.6 |

The following diols were used:
Ex. 2: 2-n-butyl-2-ethyl-1,3-propane diol
Comp. Ex. A: 3-methyl-1,3-propane diol
Comp. Ex. B: 1,6-hexane diol TABLE 2-continued

|  | amount in g |
|---|---|
| Comp. Ex. C: 2,2-dimethyl-1,3-propane diol | |
| Comp. Ex. D: 2,2,4-trimethyl-1,3-pentane diol | |

The following diols were used:
Ex. 2: 2-n-butyl-2-ethyl-1,3-propane diol
Comp. Ex. A: 3-methyl-1,3-propane diol
Comp. Ex. B: 1,6-hexane diol
Comp. Ex. C: 2,2-dimethyl-1,3-propane diol
Comp. Ex. D: 2,2,4-trimethyl-1,3-pentane diol
Comp. Ex. E: hydroxy pivalyl hydroxy pivalate
Comp. Ex. F: 1,4-clohexane dimethanol In Table 3 the results are listed of the use of the above-mentioned diols in clearcoat compositions together with the properties of the resulting coatings.

TABLE 3

|  | 2 | A | B | C | D | E | F |
|---|---|---|---|---|---|---|---|
| Solvability | + | + | − | + | + | + | + |
| Compatibility | + | + | + | − | + | + | + |
| Initial Viscosity | 18.1 | 17.6 | 18.5 | 18.3 | 17.8 | 16.3 | 18.9 |
| FTH at 60° C. (min.) | 30 | 30 | nd | nd | 30 | 35 | 30 |
| FTH at RT (min.) | 122 | 120 | nd | nd | 150 | 109 | 106 |
| Potlife (min.) | 115 | 60 | nd | nd | 115 | 175 | 50 |
| EHO (n = 5) | 8.3 | 7.5 | nd | nd | 8.4 | 8.1 | 7 |
| Strike-in | + | + | + | + | ± | − | − |
| Persoz hardness at 60° C. after 7 days (s) | 79 | 46 | nd | nd | 54 | 65 | 44 |
| Persoz hardness at RT after 7 days (s) | 46 | 23 | nd | nd | 34 | 52 | 43 |

+ = good, − = bad, ± = moderate

Comparative Example B fails because of the insolubility of 1,6-hexane diol in the coating composition. The diol remains solid in the formulation. Comparative Example C fails because of the incompatibility of 2,2-dimethyl-1,3-propane diol in the formulation. A haze is clearly visible. Both Comparative Examples E and F fail because of the strike-in effect on the basecoat. Furthermore, Comparative Examples A and F show an unfavourable potlife/drying balance in comparison with Example 2. Moreover, the appearance of clearcoat F is less than that of clearcoat 2. Comparative Example D performs less than example 2. The strike-in effect is noticeable, the clearcoat D is softer than the clearcoat 2, and its curing speed at room temperature is slower than that of clearcoat 2.

From the above, it can be seen that a clearcoat composition according to the present invention as exemplified by example 2 shows better and unexpected results in comparison with clearcoat compositions comprising other diols.

Example 3

This example shows a basecoat/clearcoat system wherein the clearcoat composition comprises a hydroxy group-containing polyacrylate, a polyisocyanate compound, 2-n-butyl-2-ethyl-1,3-propane diol, and a polyester of hexahydrophthalic acid and 2-n-butyl-2-ethyl-1,3-propane diol.

Washprimer CR ex Sikkens was applied by spraying onto a sanded steel panel. Autocryl® filler 3110 ex Sikkens was applied by spraying onto it after drying. After sanding of the filler, Autowave® MM metallic basecoat (a water-borne basecoat ex Sikkens) was sprayed onto it. After the basecoat was dried at room temperature for 30 minutes, the clearcoat composition was applied by being sprayed on top of it. The coating was cured at 60° C. The dried layer thickness of the basecoat was 10–20 microns, the layer thickness of the clearcoat was 40–70 microns.

The clearcoat composition comprises two components which are mixed prior to use. The two components are shown in Table 4:

TABLE 4

|  | amount in g |
|---|---|
| Component 1 | |
| high-solids acrylic B | 153.1 |
| 2-n-butyl-2-ethyl-1,3-propane diol + polyester | 29.8 |
| methoxy propyl acetate | 28 |
| methyl isoamyl ketone | 8.4 |
| isobutyl acetate | 18.9 |
| butyl acetate | 22.1 |
| DBTL | 0.49 |
| Dow Corning PA 11 | 2.63 |
| Tinuvin 292 | 1.4 |
| Tinuvin 1130 | 1.8 |
| Component 2 (hardener) | |
| Desmodur ® LS2025 | 90.2 |
| butyl acetate | 19.3 |
| ethoxy ethyl propionate | 19.3 |

The pot life of the clearcoat composition is 85 min. The viscosity of the clearcoat composition when ready to spray is 17.7 seconds. The VOC of the coating composition (ready-to-spray) is 439 g/l (calculated from the composition of the Table). The clearcoat is free to handle after 35 min. The appearance of the coating is excellent. EHO is rated 8 (n=4). No strike-in effect can be detected. The Persoz hardness of the coating (after 7 days) is 119 seconds.

We claim:

1. A coating composition comprising a hydroxy group-containing film forming polymer with a hydroxy value between 75 and 300 mg KOH/g solid resin, a polyisocyanate compound, and a diol of the general formula HO—$CH_2$—CR($C_2H_5$)—$CH_2$—OH, wherein R is an alkyl group having 3–8 carbon atoms.

2. The coating composition according to claim 1, wherein R is n-butyl.

3. The coating composition according to claim 1, wherein the hydroxy group-containing film forming polymer is a hydroxy group-containing polyacrylate.

4. The coating composition according to claim 1, wherein the diol is present in the coating composition in an amount of 1 to 25% by weight, based on the weight of the hydroxy group-containing film forming polymer.

5. The coating composition according to claim 1, wherein the composition comprises less than 500 g/l of volatile organic solvent based on the total composition.

6. A coating composition comprising a hydroxy group-containing film forming polymer with a hydroxy value between 75 and 300 mg KOH/g solid resin, a polyaccyanate compound, and a diol of the general formula HO—$CH_2$—CR($C_2H_5$)—$CH_2$—OH, wherein R is an alkyl group having 3–6 carbon atoms and further comprising a polyester or polyurethane having units derived from the diol.

7. A method of coating which comprises applying a coating composition according to claim 1 to a substrate.

8. The method according to claim 7, wherein the coating composition is applied by spraying it on a substrate.

9. The method according to claim 7, further comprising curing the coating composition at temperatures between 0 and 80° C.

10. A coated substrate wherein the substrate is applied according to the method of claim 7.

11. A coated substrate according to claim 10, wherein the substrate is an automobile or a large transport vehicle, such as trains, buses, and airplanes.

12. The coating composition according to claim 1, wherein the coating composition is a clearcoat composition.

13. A method of coating, which comprises applying a clearcoat composition according to claim 12 to the surface of a basecoat.

14. The method according to claim 13, wherein the clearcoat composition is applied by spraying it onto the surface of a basecoat.

15. The method according to claim 13, further comprising curing the coating composition at temperatures between 0 and 80° C.

16. A coated substrate wherein the substrate is applied according to the method of claim 13.

17. A coated substrate according to claim 16, wherein the substrate is an automobile or a large transport vehicle, such as trains, buses, and airplanes.

* * * * *